United States Patent [19]

Goudey

[11] 4,180,935
[45] Jan. 1, 1980

[54] HYDROFOIL TRAWL DOOR

[75] Inventor: Clifford A. Goudey, Arlington, Mass.

[73] Assignee: Massachusetts Institute of Technology, Cambridge, Mass.

[21] Appl. No.: 828,486

[22] Filed: Aug. 29, 1977

[51] Int. Cl.² .............................................. A01K 73/02
[52] U.S. Cl. .............................................................. 43/9
[58] Field of Search .................................. 43/9, 43.13

[56] References Cited

U.S. PATENT DOCUMENTS

| 3,281,980 | 11/1966 | Luketa | 43/9 |
| 4,028,840 | 6/1977 | Wille | 43/43.13 |

FOREIGN PATENT DOCUMENTS

| 843073 | 6/1970 | Canada | 43/9 |
| 2161264 | 6/1973 | Fed. Rep. of Germany | 43/9 |
| 221385 | 7/1968 | Sweden | 43/9 |

Primary Examiner—James G. Smith
Attorney, Agent, or Firm—Arthur A. Smith, Jr.; Martin M. Santa

[57] ABSTRACT

A hydrodynamically superior trawl door with increased efficiency in harvesting fish and reducing fuel expenditures is composed of curved steel panels, which may be of constant radius to allow for economy in manufacturing. The door approximates an ideal hydrofoil surface, presenting a streamlined surface to the flow of water and a relatively sharp hydrodynamic trailing edge, and allowing for a moderate angle of attack and a high lift coefficient. The door is hollow and may be airtight and contains a flood opening with a baffle to allow air to be trapped inside to provide, even when hydrostatically compressed, some measure of vertical stablity. Further, the water ballast is automatically jetisoned during hauling in. The bottom of the door is curved to allow easy clearance of seafloor obstructions.

33 Claims, 6 Drawing Figures

HYDROFOIL TRAWL DOOR

This invention was made in the course of work supported by the Department of Commerce, National Oceanic and Atmospheric Administration, Office of Sea Grant, Contract No. 04-6-148-44007 and also by the National Science Foundation under Contract No. C-APR77-19702.

This invention relates to trawling devices and more particularly to that type of device known as trawl boards, trawl doors, or otter doors, which when used in conjunction with a trawl net serve to maintain the net open and horizontal.

The trawl door in common use today is constructed of wood and banded with steel. It has seen little improvement in recent years even though it is recognized as a major source of trawl system inefficiency. This inefficiency results from the poor hydrodynamic characteristics due to its high angle of attack, flat profile, and irregular surface.

The need for a more efficient trawl door has been increased due to the recent increase in fuel prices and the need to more efficiently harvest fish.

The principal object of this invention is to provide the required horizontal opening of the net while reducing the accompanying towing resistance of the trawl boards. Another object of this invention is to provide a trawl door which can be used in both bottom trawling and mid-water trawling. A further object of this invention is to provide a trawl door which has features which provide for the proper establishment of the horizontal spread before the trawl system reaches the seabed thereby reducing the possibilities of fouling of the gear. A still further object of this invention is to provide a trawl door which is of simple, economical, and durable construction.

Other advantages, features, and objects of the invention will appear from the following description taken together with the drawings in which.

Figure 1:
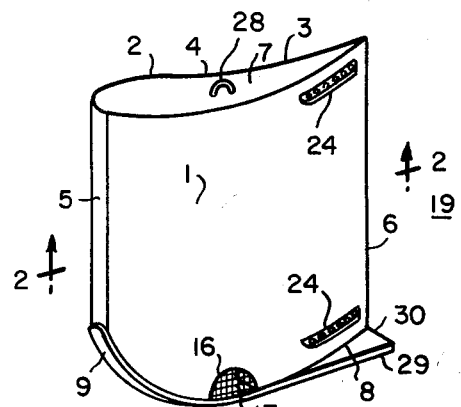
FIG. 1 is a perspective of the trawl door of this invention employed on the port side of the trawl net.

The general configuration of the trawl door 19 is shown in FIG. 1. The door 19 is composed of curved panels each of constant radius assembled in such a manner as to approximate an ideal hydrofoil surface. Panel 1 is the back or suction side of the trawl door and is convex outward. Panels 2 and 3 are joined along line 4 to form the front or pressure side of the trawl door. Panel 2 is convex outward and Panel 3 is concave and the two are joined at the vertical line 4 in such a manner that the tangents of the two panels at line 4 substantially coincide, and the joint forms a smooth point of inflection presenting a streamlined surface to the flow of water. The forward part of the trawl door 19 is composed of a pipe 5 and panels 1 and 2 are joined to this pipe at their forward edges so as to form a smooth transition. The after edge 6 of the trawl door 19 is formed by the joining of panels 1 and 3 to form a relatively sharp hydrodynamic trailing edge. The top of the trawl door is made up of a flat panel 7 joined at its perimeter to panels 1, 2, and 3 and to pipe 5. The bottom of the trawl door is made up of a panel 8 which is flat in its rear portion but curved upwards in its front portion 9 to provide for easy clearance of obstructions on the seabed.

Figure 2:
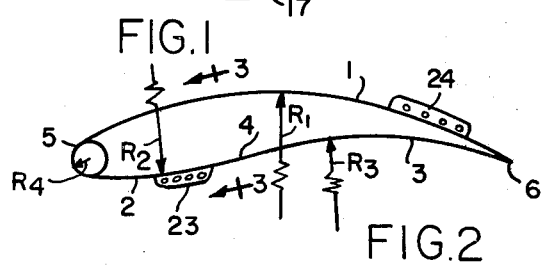
FIG. 2 is a cross-sectional view of FIG. 1 taken at II—II.

FIG. 2 indicates clearly a possible arrangement of panels yielding a sectional shape well suited to a low aspect ratio, moderate angle of attack, high lift coefficient trawl door shape. In this particular configuration, each panel is of the same radius of curvature, that radius being equal to the chord length of the section. The diameter of the pipe section 5 is one twelfth of this chord length and the intersection of panels 2 and 3 is typically about 40 percent of the chord length from the leading edge. This combination of proportions yields excellent hydrodynamic characteristic but is merely one particular embodiment of this novel feature. The advantages of such a shape are clear. Unlike airfoil sections used for sustaining aircraft flight where the foil surface is thin and easily made to conform to any fair sectional shape, a trawl door must be made of thicker more robust materials requiring the use of a roller press to achieve curvature. By using panels of constant radius of curvature and in addition having all panels of equal radius of curvature considerable economies can be realized in manufacture.

Figure 4:
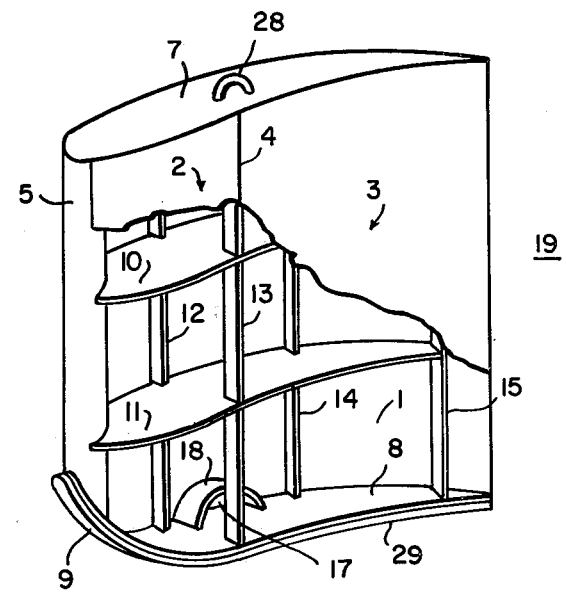
FIG. 4 is a perspective view partially in section of a trawl door employed on the starboard side of the trawl net.
Figure 3:
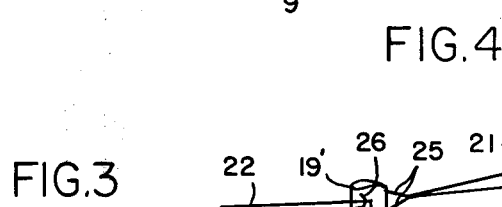
FIG. 3 is a cross-sectional view on the line III—III of FIG. 2.

FIGS. 2 and 4 indicates the structural arrangement desirable to provide the strength and rigidity necessary to ensure trawl door durability. Upper frame 10 and lower frame 11 are essentially of the same shape as top 7 except that these frames are notched to received stringers 12, 13, and 14. The trailing ends of those frames are truncated to abut stringer 15. Bottom panel 8 is essentially the same shape as top panel 7 except that the forward portion 9 must be elongated to maintain the proper width as it curves up providing the rounded lower front corner. A skid plate 29 of thicker material than bottom plate 8 is welded onto the panel 8 to strengthen it. Skid plate 29 is substantially of the same shape as panel 8 except near the trailing edge 6 of the door where it is extended to form a broader surface 30 on which the door may skid on the ocean floor. Also indicated in the figures is the flooding opening or scupper 16 provided to allow the entrance of sea water as the door descends after launching. This opening is fitted with a grid 17 to prevent the entrance of foreign objects while operating on the bottom. The door is airtight except for opening 16 and has no provision for the escape of air. Therefore, the air trapped inside the trawl door during submergence remains, albeit compressed by the hydrostatic pressure, to provide some measure of vertical stability. The volume displaced by this air is determined by the depth of the door in the water. Its buoyancy can be substantial when first submerged but at greater depths will become negligible. A trawl door with this feature will sink more slowly at the beginning of its de-employment then at the end allowing the proper establishment of the horizontal spread of the trawl system early in its setting out procedure. FIG. 4 shows baffle 18 which projects from the opening 16 in plate 1 down toward plates 2 and 3 to prevent the loss of trapped air should the door become oriented with plates 2 and 3 down due to an obstruction or slack tow cables. The edges of baffle 18 meet plate 1 and plate 8 to form an airtight seal though which air cannot escape when the plates 2 and 3 are in the downward direction. By ensuring that the air cannot escape through opening 16, the trawl door will automatically jetison its water ballast during the hauling in procedure, the door being essentially void of water as it breaks the sea surface.

As an example, a traditional 1,000 lb. trawl door would weigh about 600 lbs. when submerged, regardless of depth. The present invention in a 1,000 lb. configuration and having a hollow volume of around 12 cubic feet would weigh around 250 lbs. when just submerged at the surface. However, at a depth of 100 feet, the door would weigh about 620 lbs. and at 300 feet would weigh 800 lbs. The air trapped in this door though greatly compressed at 300 feet still represents around 80 lbs. of buoyancy in the upper part of the door helping to maintain the door's upright position.

The particular embodiment shown in the figures is described as fabricated by steel panels being welded together. Other materials or methods of airtight construction could be equally as effective.

The rectangular shape shown in the figures was selected for ease of construction though other shapes could be used.

Figure 5:
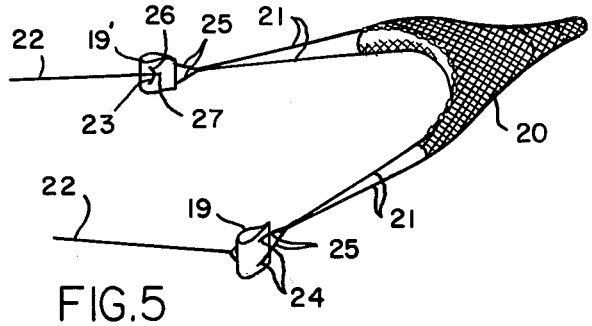
FIG. 5 is a diagrammatical view of a pair of the trawl doors being used in the operation of bottom trawling.

FIG. 5 shows the port trawl door 19, and the starboard trawl door 19', the trawl net 20, the net legs 21, and the tow cable 22. The configuration shown is typical of the type used by most trawlers although the trawl boards commonly in use are flat rather than foil shaped as indicated.

An important advantage of this invention is that due to its streamline and cambered shape of the required spreading force is achieved with much less towing resistance compared with other doors. This new trawl door can be used with an existing trawl system by replacing the old doors. The trawl doors of this invention are fitted with backstrap eyes 23 attached near the trailing edge 6 of suction plate 1 for connection to the backstraps 25, cable 21, and net 20. The towing cable 22 is attached to a bracket 26 attached pivotally to towing or padeyes 23 which are attached to the front panel 2 of the trawl door 19. The bracket 26 is held in position by a tensile member 27 such as a piece of chain. The position is determined experimentally to achieve the proper angle of attack. The top plate 7 has a bale 28 attached to it to which a cable may be attached in order to launch or restrain the door 19.

Figure 6:
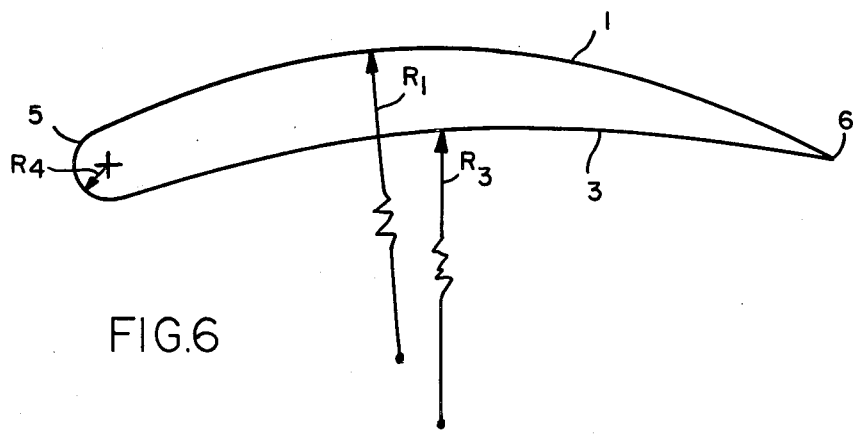
FIG. 6 is a cross-sectional view of another embodiment of the panel of this invention.

Although the preferred embodiment of the invention has been described as using two panels, one convex and one concave, on the front or pressure side of the door, it will be apparent to those skilled in the art that a door may be constructed with only one concave panel 3 on the pressure side as shown in FIG. 6. In this case, the radius of panel 3 may be substantially equal to that of the radius R, of panel 1 or may be extend to infinite radius in which case panel 3 is a flat plate. The performance of a trawl door using only the panel 3 on its pressure side will depend upon how closely such overall cross-section approximates the hydrofoil shape. A door comprised of only one pressure-side panel 3 is less expensive than one having two panels 2, 3 and the objects and features of this invention are obtained in such doors with some difference in performance.

I claim:

1. A trawl door with a hydrofoil cross-section comprising:
   a plurality of connected substantially rectangular first, second, and third plates,
   the cross-sectional shape of said door defined by a plurality of curved sections of said plates, the first plate of which is convex outward,
   the second plate is concave outward, one end of each first and second plate being joined at their ends to form an acute angle at the trailing edge of said door, the third plate is convex outward and at one of its ends joins the second plate at its remaining end, the tangents of the second and third plates coinciding at their juncture to form a smooth point of inflection;
   a pipe, the remaining ends of the first and third plates are joined with said pipe, whose radius is at least an order of magnitude smaller than the radius of said first and second plates, to form a convex arc such that the tangents of the first and third plates when they are joined to the pipe form a fair surface with said pipe, said pipe arc forming the leading edge of said door,
   said assembly of first, second, and third plates and pipe having a cross-section in the form of a hydrofoil having high lift and low drag,
   a first and second end plate, the unconnected ends of said first, second, and third plates and said pipe ends being attached to said end plates,
   one of said end plates being substantially heavier than the other to form the bottom of said door,
   at least one opening in said door near its bottom being so constructed as to allow water to enter and exit the interior of said door.

2. A trawl door with the cross-sectional shape described in claim 1 wherein said first, second, and third plates form arcs of the same radius of curvature.

3. A trawl door with the cross-sectional shape described in claim 2 wherein the first, second, and third plate arcs are of radius substantially equal to the chord length of the cross-section, and the pipe arc is of radius of curvature substantially one twenty-fourth of the plate radius, and where the length of the second plate arc is substantially sixty percent of the chord length.

4. The trawl door of claim 1 wherein said plates and pipe are so joined as to form a door which is a hollow airtight structure except for said at least one opening which provides at least one flooding port near the bottom portion of the door such that as the trawl door submerges in water the air trapped within becomes compressed by hydrostatic pressure but remains in the trawl door to provide vertical stability while the door is being used in trawling.

5. A trawl door as in claim 4 comprising in addition a baffle within said door located at said flooding port which prevents the escape of air should the door depart from its desired vertical attitude during bottom trawling.

6. The trawl door of claim 2 wherein said plates and pipe are so joined as to form a door which is a hollow airtight structure except for said at least one opening which provides at least one flooding port near the bottom portion of the door such that as the trawl door submerges in water the air trapped within becomes compressed by hydrostatic pressure but remains in the trawl door to provide vertical stability while the door is being used in trawling.

7. A trawl door as in claim 6 comprising in addition a baffle within said door located at said flooding port which prevents the escape of air should the door depart from its desired vertical attitude during bottom trawling.

8. The trawl door of claim 2 wherein said door comprises means for providing buoyancy to the top of said door whereby additional vertical stability of said door when immersed in water is obtained over that provided by said bottom plate alone.

9. The trawl door of claim 2 wherein said bottom plate curves upwardly with respect to said door at the leading edge of said door.

10. The trawl door of claim 9 comprising in addition a skid plate attached to said bottom plate and having substantially the same shape as the bottom plate but where the skid plate extends transversely beyond the bottom plate in the region of the trailing edge of said door to form a wider bottom surface of said door whereby said board skids more readily when in contact with the sea bottom when bottom trawling.

11. The trawl door of claim 1 wherein said first, second, and third plates each form arcs each having a constant radius of curvature.

12. The trawl door of claim 1 wherein said door comprises means for providing buoyancy to the top of said door whereby additional vertical stability of said door when immersed in water is obtained over that provided by said bottom plate alone.

13. The trawl door of claim 11 wherein said plates and pipe are so joined as to form a door which is a hollow airtight structure except for said at least one opening which provides at least one flooding port near the bottom portion of the door such that as the trawl door submerges in water the air trapped within becomes compressed by hydrostatic pressure but remains in the trawl door to provide vertical stability while the door is being used in trawling.

14. A trawl door as in claim 13 comprising in addition a baffle within said door located at said flooding port which prevents the escape of air should the door depart from its desired vertical attitude during bottom trawling.

15. The trawl door of claim 11 wherein said door comprises means for providing buoyancy to the top of said door whereby additional vertical stability of said door when immersed in water is obtained over that provided by said bottom plate alone.

16. The trawl door of claim 11 wherein said bottom plate curves upwardly with respect to said door at the leading edge of said door.

17. The trawl door of claim 16 comprising in addition a skid plate attached to said bottom plate and having substantially the same shape as the bottom plate but where the skid plate extends transversely beyond the bottom plate in the region of the trailing edge of said door to form a wider bottom surface of said door whereby said board skids more readily when in contact with the sea bottom when bottom trawling.

18. The trawl door of claim 1 wherein said bottom plate curves upwardly with respect to said door at the leading edge of said door.

19. The trawl door of claim 18 comprising in addition a skid plate attached to said bottom plate and having substantially the same shape as the bottom plate but where the skid plate extends transversely beyond the bottom plate in the region of the trailing edge of said door to form a wider bottom surface of said door whereby said board skids more readily when in contact with the sea bottom when bottom trawling.

20. A trawl door with a hydrofoil cross-section comprising a first and second plate, each plate being curved, said plates being joined at one end of each at an acute angle to form the trailing edge of said door, a pipe for forming the leading edge of said door, said first plate forming a convex arc being joined at its other end to said pipe, to form a first junction running along the length of said pipe, said second plate forming a concave arc being joined at its other end to said pipe to form a second junction running along said pipe on substantially the opposite side of said pipe from said first junction, said pipe radius having a radius sufficiently large so that the tangents of the first and second plates when they are joined to the pipe form a fair surface with said pipe and the portion of said pipe between said points with first and second plates form a convex pipe arc, said pipe arc forming the leading edge of said door, end plates fastened to the remaining ends of said plates and the ends of said pipe to form a hollow trawl door of substantially hydrofoil cross-section, one of said end plates being subtantailly heavier than the other to form the bottom of said door, said door having at least one opening near its bottom to provide a flooding port to allow water to enter and exit the interior of said door when said door is immersed in water.

21. The trawl door of claim 20 wherein each of said plates are of constant radius and said pipe radius is substantially an order of magnitude smaller than the radius of each plate.

22. The trawl door of claim 20 wherein said plates and pipe are so joined as to form a door as a hollow airtight structure except for said at least one opening which provides at least one flooding port near the bottom portion of the door such that as the trawl door submerges in water the air trapped within becomes compressed by hydrostatic pressure but remains in the trawl door to provide vertical stability while the door is being used in trawling.

23. A trawl door as in claim 22 comprising in addition a baffle within said door located at said flooding port which prevents the escape of air should the door depart from its desired vertical attitude during bottom trawling.

24. The trawl door of claim 20 wherein said door comprises means for providing buoyancy to the top of said door whereby additional vertical stability of said door when immersed in water is obtained over that provided by said bottom plate alone.

25. The trawl door of claim 20 wherein said opening is in the first plate and contiguous to the bottom end plate.

26. The trawl door of claim 20 wherein the radius of said second plate is at least as great as the radius of said first plate.

27. The trawl door of claim 21 wherein said plates and pipe are so joined as to form a door as a hollow airtight structure except for said at least one opening which provides at least one flooding port near the bottom portion of the door such that as the trawl door submerges in water the air trapped within becomes compressed by hydrostatic pressure but remains in the trawl door to provide vertical stability while the door is being used in trawling.

28. The trawl door of claim 21 wherein said door comprises means for providing buoyancy to the top of said door whereby additional vertical stability of said door when immersed in water is obtained over that provided by said bottom plate alone.

29. The trawl door of claim 21 wherein said opening is in the first plate and contiguous to the bottom end plate.

30. The trawl door of claim 6 wherein said bottom plate curves upwardly with respect to said door at the leading edge of said door.

31. The trawl door of claim 21 wherein said bottom plate curves upwardly with respect to said door at the leading edge of said door.

32. The trawl door of claim 30 comprising in addition a skid plate attached to said bottom plate and having substantially the same shape as the bottom plate but where the skid plate extends transversely beyond the bottom plate in the region of the trailing edge of said door to form a wider bottom surface of said door whereby said board skids more readily when in contact with the sea bottom when bottom trawling.

33. The trawl door of claim 31 comprising in addition a skid plate attached to said bottom plate and having substantially the same shape as the bottom plate but where the skid plate extends transversely beyond the bottom plate in the region of the trailing edge of said door to form a wider bottom surface of said door whereby said board skids more readily when in contact with the sea bottom when bottom trawling.

* * * * *